United States Patent

[11] 3,614,435

[72] Inventors Joseph J. Halpin
 Alexandria, Va.;
 Richard F. Wenzel, Oxon Hill, Md.
[21] Appl. No. 782,545
[22] Filed Dec. 10, 1968
[45] Patented Oct. 19, 1971
[73] Assignee The United States of America as
 represented by the Secretary of the Navy

[54] DOSIMETER FOR PULSED IONIZING RADIATION
 1 Claim, 2 Drawing Figs.
[52] U.S. Cl. .................................................. 250/71.5 R
[51] Int. Cl. .................................................. G01t 1/20
[50] Field of Search .......................................... 250/71.5;
 252/301.4; 324/158

[56] References Cited
 UNITED STATES PATENTS
 2,760,078 8/1956 Youmans ..................... 250/83.3
 2,913,669 11/1959 Hebert, Jr. ..................... 324/158

OTHER REFERENCES
"On Fast Electron Pumping of Ruby," R. P. de Figueiredo, Quantum Electronics; Proceedings of the Third International Congress, Columbia University Press, New York, 1964, pp. 1353, 1354, 1368- 1371

Primary Examiner—James W. Lawrence
Assistant Examiner—Davis L. Willis
Attorneys—R. S. Sciascia, M. L. Crane and A. L. Branning ABSTRACT: The invention is directed to a dosimeter for pulsed beams of high-energy, ionizing radiation. The dosimeter employs the radiative recombination of radiation-induced excitation in a material. The dose is proportional to this fluorescence signal at any time. To be useful, this fluorescence should have a lifetime about an order of magnitude greater than the duration of the radiation pulse, so as to make the excitation to occur instantaneously. In addition, the material should be relatively insensitive to lattice displacement effects so that the dosimeter may be used for large cumulative doses. An example of such a material is low chromium concentration ruby single crystals ($Al_2O_3$:Cr), i.e. Cr concentrations 0.0003 percent to 0.001 percent by weight.

INVENTORS
JOSEPH J. HALPIN
RICHARD F. WENZEL

DOSIMETER FOR PULSED IONIZING RADIATION

BACKGROUND OF THE INVENTION

This invention relates to dosimeters for ionizing radiation and more particularly to a dosimeter for pulsed, high-energy ionizing radiation.

Heretofore, various systems and mechanisms have been used for measuring absorbed dose or exposure for pulsed ionization radiation. These systems include ionization chambers, radiophotoluminescence dosimeters (silver-activated glass) thermoluminescence dosimeters (LiF, $CaF_2$) and dosimeters that make use of changes in optical density (cobalt glass). Such devices have their drawbacks wherein they measure cumulative dose, or they must be processed somehow to determine dose, or they do not give an immediate dose reading or they are affected by noise in the output signal.

SUMMARY OF THE INVENTION

This invention makes use of a ruby single crystal ($Al_2O_3$: Cr) dosimeter which absorbs ionizing radiation resulting in an immediate intense fluorescence at the chromium R lines (6943A, 6929A). The lifetime of this fluorescence has been determined to be about 3 msec. and therefore can be used for radiation pulses of duration 300 $\mu$sec. or less. The dosimeter recovers immediately and is suitable for determining dosage of repetitive pulses of radiation such as from exposure to the electron beam from a linac. The dosimeter not only gives an immediate dose reading but is reusable without any treatment for cumulative doses up to $10^8$ rad. (ruby)

It is therefore an object of the present invention to provide a dosimeter for immediately determining the dosage of pulsed, high-energy, ionizing radiation.

Another object is to provide a dosimeter which is reusable without any treatment for large cumulative doses.

Still another object is to provide a dosimeter material which immediately fluoresces as a result of pulsed, high-energy ionizing radiation for immediate determination of the ionization dose.

Other objects and advantages of the invention will hereinafter become more fully apparent from the following description and drawings.

DESCRIPTION OF THE INVENTION

Figure 1:
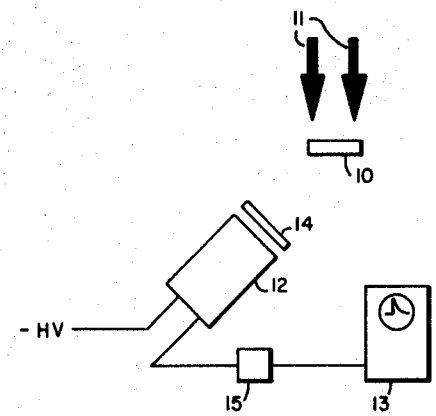
FIG. 1 illustrates apparatus for detecting a pulsed beam of electrons.

Now referring to the drawing, there is shown by illustration apparatus for carrying out the teaching of this invention. A single crystal of ruby 10 that has a nominal chromium concentration of 0.001 percent, is positioned for exposure to a pulsed beam of high-energy ionizing radiation represented by arrows 11. The pulsed beam of radiation causes the ruby crystal to fluoresce in accordance with the amount of radiation passing into the crystal. The fluorescent light is directed onto a photomultiplier 12 which converts the light into an electrical signal. The electrical signal is then directed to a suitable indicator 13 which indicates the value of the signal output. The signal output as indicated is accordingly equated to radiation dose. Thus, the output signal of the photomultiplier is a direct measure of the relative dose delivered to the ruby crystal by the pulsed, high-energy ionizing radiation.

As shown, the system may include a filter 14 in the light path to the photomultiplier which passes only desired light to the photomultiplier. Also the system may include any suitable amplifier to amplify the signal output to the signal indicator. The system is shown with the photomultiplier signal AC coupled into an emitter follower 15 with a 100 K-ohm load resistor. The emitter follower is connected to the oscilloscope (recorder) by a 50-ohm cable. A light shield may be used to shield the photomultiplier from extraneous light such that only the light photons from the ruby crystal detector are incident on the photomultiplier.

In operation, a pulsed beam of high-energy ionizing radiation of 300-$\mu$sec. or less duration is incident on the chromium-doped single crystal of ruby. The ionizing radiation interacts with the atoms within the ruby to produce fluorescence. The life time of the fluorescence is approximately 3 msec. Therefore, the fluorescent intensity may be measured at any time after exposure such that the fluorescent signal is reasonably intense but yet beyond the expiration of the radiation pulse and beyond the radiation-induced noise. The fluorescent light is incident on the photocathode of the photomultiplier tube within which the photons are converted to an electrical signal. The electrical signal is multiplied within the photomultiplier tube as usual. The output signal of the photomultiplier tube may be amplified and then directed to a recorder such as an oscilloscope which displays a signal trace which may be photographed for a permanent record. Any other suitable recorder means may be used by which the signal may be recorded for determination of the radiation dose.

Figure 2:
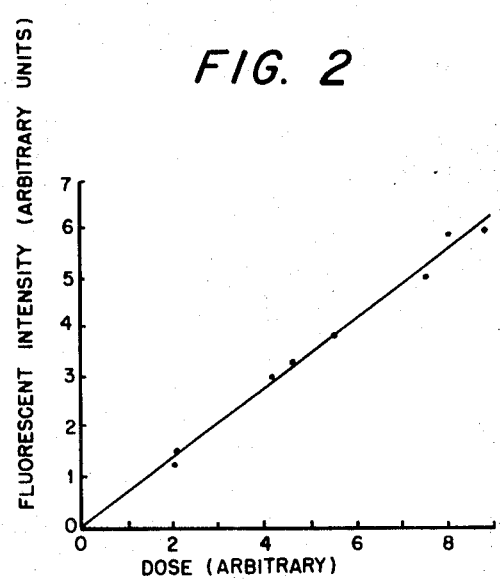
FIG. 2 illustrates a plot of fluorescent intensity vs. dose where the fluorescent intensity is measured at a time 1 msec. after conclusion of the excitation by a short (0.5-$\mu$sec., 30-Mev.) linac pulse.

FIG. 2 illustrates a plot of the fluorescent intensity vs. dose for different values of dose where the fluorescent intensity was measured at a time 1 msec. after conclusion of a (0.5-$\mu$sec., 30-Mev.) linac pulse. It is noted that the curve shown in FIG. 2 shows a linear relationship of fluorescent intensity with dose. Thus, such a relationship enables one to measure the voltage output of the photomultiplier at 1 msec. (arbitrary choice) after the pulse to provide a direct measure of the relative dose incident on the chromium-doped single crystal of ruby.

The fluorescence vs. dose curve has not been found to be significantly influenced by cumulative absorbed doses of up to $1\times10^8$ rad (ruby). When the cumulative absorbed dose is greater than $1\times10^8$ rad (ruby) the dosimeter crystal may be routinely annealed in air at 1,000° C. for about 15 minutes with heating and cooling rates that do not exceed 10° C./min. in order to eliminate possible lattice displacement effects.

A dosimeter as described above permits one to immediately obtain a value for a dose, the dosimeter is reusable without any treatment for doses up to about $1\times10^8$ rad (ruby) and the signal from the dosimeter may be read at a time later than the radiation pulse excitation. Therefore, the dosimeter is not hampered by radiation-induced detector noise since the noise subsides before the dosimetry measurement is made.

This system has been described using a chromium-doped (0.001 percent) single crystal of ruby ($Al_2O_3$:Cr), however, it has been determined that crystals with as little as 0.0003 percent chromium doping may be used with satisfactory results. Nominally "pure" sapphire (commercial type) contains about 0.0003 percent chromium contaminant concentration. Therefore, commercial-type sapphire provides a good dosimeter material which may be used in accordance with the teaching of this invention.

The use of radiative recombination of radiation-induced excitation as a dosimeter has been set forth above for chromium-doped ruby crystals. However, any crystal or material can be used which has a radiation-induced fluorescence with a time constant about an order of magnitude greater than the duration of the radiation pulse so as to make the excitation appear to occur instantaneously; a further requirement is that the material must be relatively insensitive to lattice displacement effects so that the dosimeter may be used for large cumulative doses.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A method of measuring dosage of pulsed, high-energy ionizing radiation; which comprises, positioning a chromium-doped, single crystal ruby material in a position to receive incident pulsed ionizing radiation,
allowing said crystal ruby to reach ambient temperature,
maintaining said crystal at ambient temperature,
measuring fluorescent light induced within said crystal ruby material subsequent to irradiation thereof by said radiation pulse, and
comparing said measured fluorescent light induced in said crystal with a known measure to determine the amount of pulsed radiation dose received by said single crystal ruby.